(12) United States Patent
Kambe (10) Patent No.: US 6,879,737 B2
(45) Date of Patent: Apr. 12, 2005

(54) OPTICAL WAVEGUIDE DEVICE AND PROCESS FOR PRODUCTION THEREOF

(75) Inventor: Toshiyuki Kambe, Tokyo (JP)

(73) Assignee: NEC Corporation, Tokyo (JP)

( * ) Notice: Subject to any disclaimer, the term of this patent is extended or adjusted under 35 U.S.C. 154(b) by 213 days.

(21) Appl. No.: 10/025,465

(22) Filed: Dec. 26, 2001

(65) Prior Publication Data
US 2002/0118902 A1 Aug. 29, 2002

(30) Foreign Application Priority Data

Dec. 22, 2000 (JP) ........................................ 2000-391386
Mar. 21, 2001 (JP) ........................................ 2001-081184

(51) Int. Cl.[7] ............................ G02F 1/01; G02F 1/035; G02F 1/295
(52) U.S. Cl. ........................ 385/2; 385/1; 385/4; 385/8
(58) Field of Search ................................ 385/1–3, 8, 9

(56) References Cited

U.S. PATENT DOCUMENTS

| | | | | |
|---|---|---|---|---|
| 5,193,130 A | * | 3/1993 | Nishiwaki et al. | 385/14 |
| 5,455,876 A | * | 10/1995 | Hopfer et al. | 385/2 |
| 5,483,609 A | * | 1/1996 | Nakaya | 385/29 |
| 5,506,919 A | * | 4/1996 | Roberts | 385/1 |
| 6,107,116 A | * | 8/2000 | Kariya et al. | 438/87 |
| 6,211,993 B1 | * | 4/2001 | Wang et al. | 359/260 |
| 6,377,716 B1 | * | 4/2002 | Veldhuis et al. | 385/1 |
| 6,400,881 B1 | * | 6/2002 | Seino et al. | 385/130 |
| 2002/0123158 A1 | * | 9/2002 | Murai | 438/3 |
| 2002/0153149 A1 | * | 10/2002 | Okada et al. | 174/35 R |

FOREIGN PATENT DOCUMENTS

| | | |
|---|---|---|
| JP | 55-69122 A | 5/1980 |
| JP | 9-54293 A | 2/1997 |

* cited by examiner

Primary Examiner—John D. Lee
Assistant Examiner—Tina M Lin
(74) Attorney, Agent, or Firm—Young & Thompson (57) ABSTRACT

An optical waveguide device wherein a substrate is fabricated from a lithium niobate ($LiNbO_3$) substrate; at least one optical waveguide is formed in the lithium niobate substrate in such a manner that two Mach-Zehnder type directional couplers are formed, and further a phase shifter is formed in between these directional couplers; and the phase shifter is provided with an electrode of a structure including a first thin film layer being an ITO thin film containing an oxide and a second thin film layer being a chromium thin film an oxide of which is acidic, whereby an electric field produced in response to a voltage applied to the electrode is given to the optical waveguide to function as a variable optical attenuator.

17 Claims, 5 Drawing Sheets

OPTICAL WAVEGUIDE DEVICE AND PROCESS FOR PRODUCTION THEREOF

FIELD OF THE INVENTION

The present invention relates to an optical waveguide device and the process for the production thereof, and more particularly to an optical waveguide device by which reliability of an electrode is elevated in a constitution wherein optical path switching, optical attenuation or the like is implemented by means of an electrical field derived from a voltage applied to the electrode in an optical waveguide formed in a substrate as well as to the process for the production of the optical waveguide device.

BACKGROUND OF THE INVENTION

Since optical waveguide device is suited for integration and the like as well as for low power consumption, an application of such optical waveguide to optical switch, optical modulator and the like is studying. In recent years, a need for variable optical attenuator increases with a progress of DWDM (Dense Wavelength Devision Multiplexing) as a means for making optical powers of respective wavelengths uniform in case of multiplexing wavelengths, or an optical component in an optical ADM (Add Drop Multiplexer) for selecting an arbitrary wavelength to insert and remove it in a transmission line.

Figure 1:
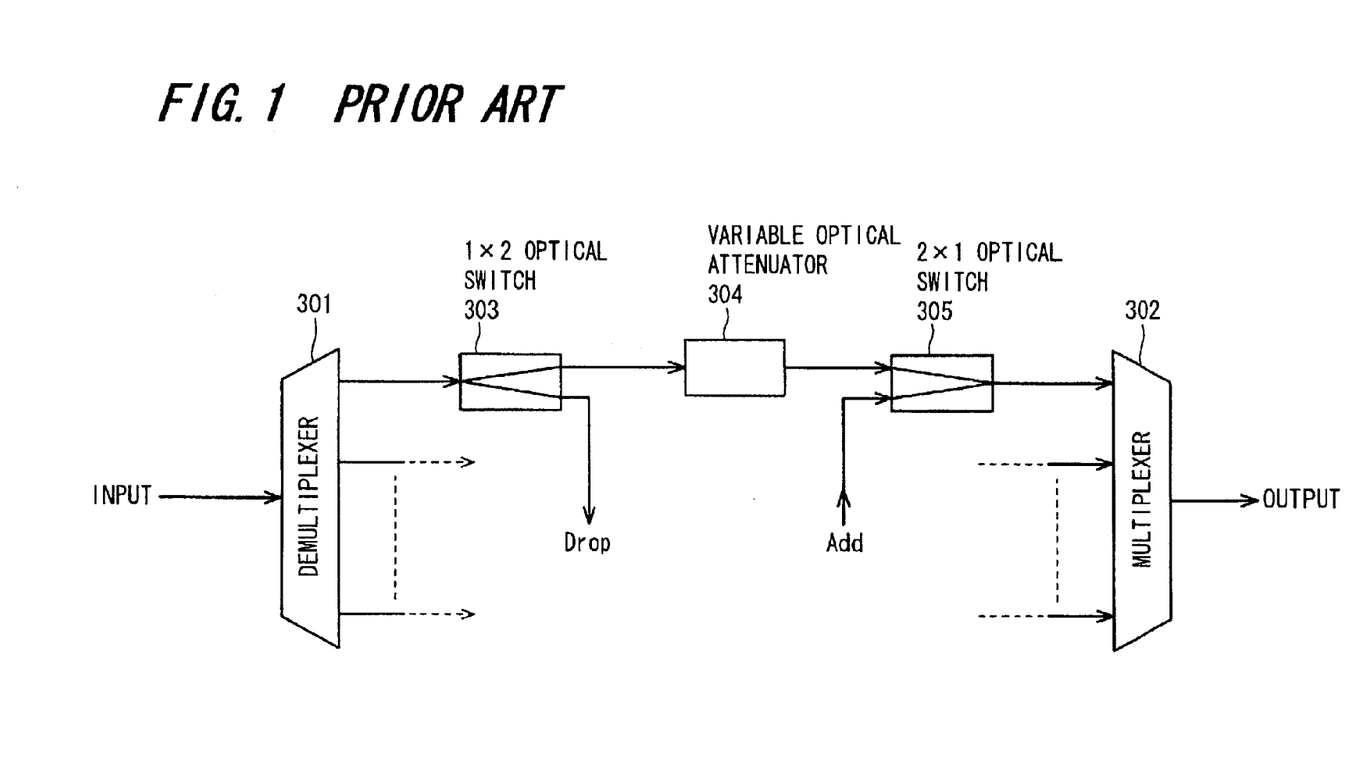
FIG. 1 is a block diagram showing a constitutional example of an optical ADM wherein a variable optical attenuator is used.

FIG. 1 is a block diagram showing a constitutional example of an optical ADM using a variable optical attenuator. Such optical ADM is disposed in midstream of an optical transmission line involving a plurality of channels (for example, thirty-two channels). In midstream of the transmission line, a demultiplexer 301 is placed on its input side, a multiplexer 302 is placed on its output side, and signal processing sections the number of which corresponds to that of the channels are disposed between both the sides. A channel in a signal processing section is composed of a 1×2 optical switch 303, a variable optical attenuator 304, and a 2×1 optical switch 305. Only a constitution of a signal processing section of a single channel is illustrated herein, but the other channels each of which has the same constitution.

A constitution of the signal processing section of a single section shown in FIG. 1 will be described. The demultiplexer 301 demultiplexes a multiplexed optical signal input in every different wavelength, and each of them is delivered to signal processing sections of respective channels. The 1×2 optical switch 303 is connected to each output line of the demultiplexer 301, either of output terminals of which is a Drop terminal, and an input terminal of the variable optical attenuator 304 is connected to the other terminal of the demultiplexer 301. To the variable optical attenuator 304, either of input terminals of the 2×1 optical switch 305 is connected, while the other input terminal is used as an Add terminal. An input terminal of the multiplexer 302 is connected to an output terminal of the 2×1 optical switch 305.

The optical ADM shown in FIG. 1 is disposed in midstream of an optical transmission line laid down with a certain distance. A multiple optical signal to be input to the demultiplexer 301 is amplified in an optical amplifier (not shown), and then the amplified signal is demultiplexed by the demultiplexer 301. Each of the demultiplexed signals is dropped (taken out to the outside) in response to switching of the 1×2 optical switch 303, or it is sent to its output side (side of the variable optical attenuator 304) without dropping the same. With respect to the optical signal sent to the output side, an amount of optical attenuation thereof is adjusted by the variable optical attenuator 304 in order to match an output level thereof with that of each channel. An optical signal from each of variable optical attenuators 304 is made to be multiple light by addition (multiplexing) in the multiplexer 302, and the resulting multiple light is output to the subsequent stage. Furthermore, when the 2×1 optical switch 305 was switched to an Add side, optical information taken from the Add end is input to the 2×1 optical switch 305, and it is added (multiplexed) to the multiple optical signal taken from the demultiplexer 301.

As the variable optical attenuator 304, the one having a structure composed of two directional couplers and two phase shifters disposed between the directional couplers wherein each of them has a directional coupler type Mach-Zehnder structure in which an optical waveguide is provided on a $LiNbO_3$ (lithium niobate: LN) substrate being advantageous for downsizing and low electric power consumption is coming into practical use. By means of the variable optical attenuator 304 having such directional coupler type Mach-Zehnder structure, an electric field is applied to an optical waveguide through which optical signal passes to change a refractive index of a substrate, whereby an amount of attenuation in signal light can be controlled.

Figure 2:
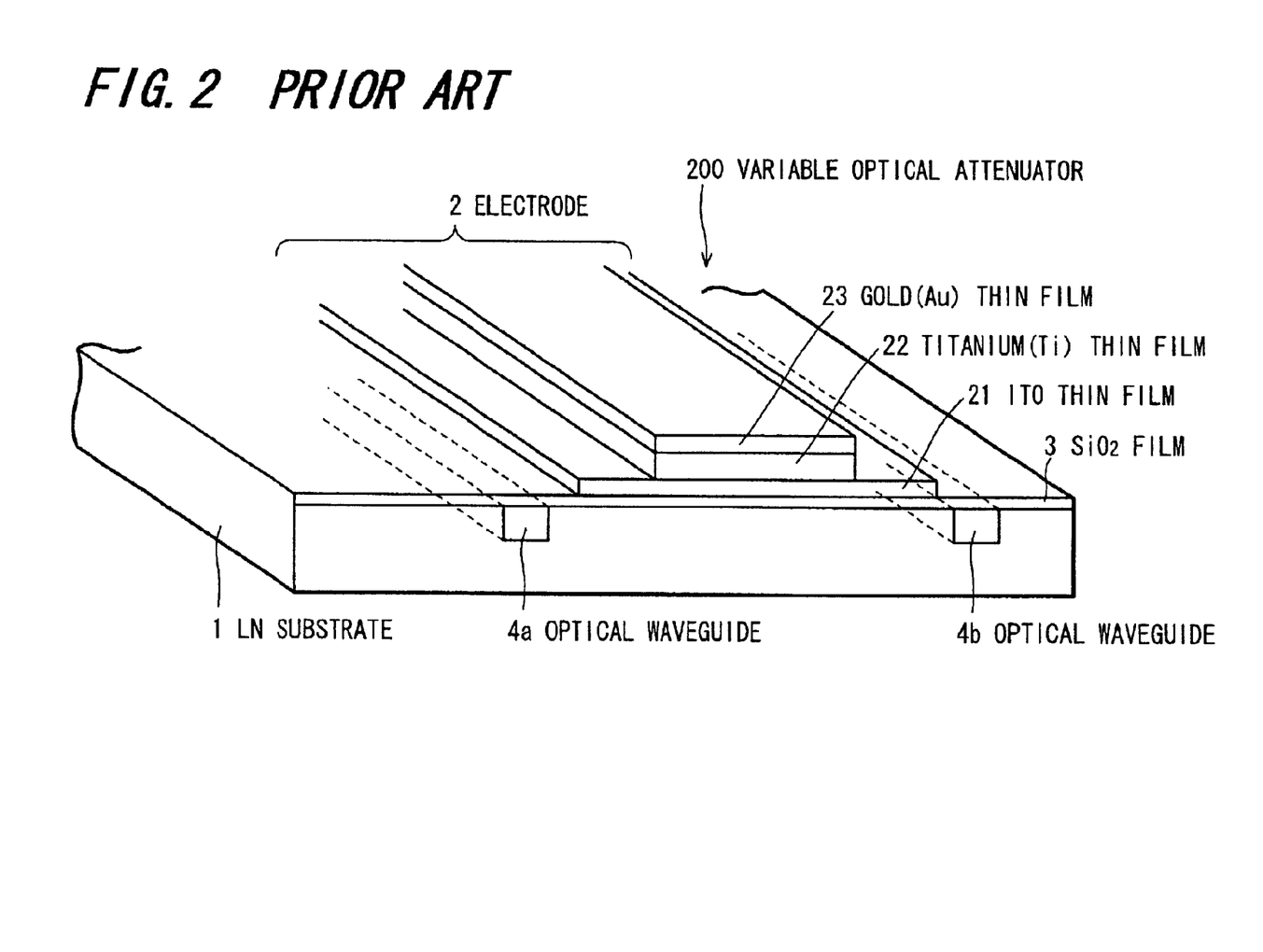
FIG. 2 is a perspective view showing a conventional optical waveguide device.

FIG. 2 is a perspective view showing a structure of a variable optical attenuator as a conventional optical waveguide device wherein a variable optical attenuator 200 is composed of a lithium niobate ($LiNbO_3$) substrate (hereinafter referred to as "LN substrate") 1, an electrode 2 formed on the LN substrate 1, and a $SiO_2$ film 3 placed in between the electrode 2 and the LN substrate 1. Moreover, optical waveguides 4a and 4b are disposed in the vicinity of a surface of the LN substrate 1 on the opposite sides of the electrode 2. The electrode 2 has a three-layered structure of an ITO (indium oxide to which tin has been added: Indium Tin Oxide) thin film 21, a titanium (Ti) thin film 22 disposed on the ITO thin film 21, and a gold (Au) thin film 23 disposed on the titanium thin film 22. A voltage having + polarity is applied to the electrode 2, while a voltage having − polarity is applied to another electrode (not shown).

The ITO thin film 21 is made of indium oxide to which has been added tin, and it is a transparent electrode having 90% or higher transmittance of visible light and $10\Omega/\square$ or less sheet resistance value. In the ITO thin film 21, it is prevented from an increase in insertion loss as a result of appearing optical absorption by approaching the titanium thin film 22 and the gold thin film 23 to optical waveguides 4a and 4b through the $SiO_2$ film due to displacement (displacement in positions of the electrode 2 and the optical waveguides 4a and 4b). Furthermore, the titanium thin film 22 functions as an adhesive for bonding the ITO thin film 21 and the gold thin film 23 to each other. The gold thin film 23 functions as an electrode plate used for connection with the outside, and it is selected on the basis of such reasons that gold is excellent in adhesive properties as a result of alloying the same and that gold makes easily wire bonding.

According to a conventional optical waveguide device, however, such fact as described hereunder has been found. Namely, when such a situation that a voltage is applied under a specific atmosphere, for example, a high-temperature atmosphere (e.g., +80° C.) continues, an oxide of the titanium thin film 22 exhibits alkaline, so that it reacts with indium oxide of the ITO thin film 21 to produce ion flux, whereby the ITO thin film 21 is gradually solved out, and it results finally in electrode short-circuit. Because of an appearance of such electrode short-circuit; reliability and expected long life in an optical waveguide device decrease remarkably.

SUMMARY OF THE INVENTION

Accordingly, the present invention has been made in view of the problems involved in a conventional optical waveguide device as mentioned above.

An object of the present invention is to provide an optical waveguide device by which reliability can be elevated and expected long life can be obtained by means of such constitution that it makes difficult to deteriorate and to short-circuit an electrode, even if a voltage is applied to the electrode under a specific atmosphere as well as to provide a process for the production of such optical waveguide device as described above.

In order to achieve the above-described object, an optical waveguide device according to the present invention comprises a substrate; at least one optical waveguide disposed in the substrate; a first conductive thin film layer placed in the vicinity of or on the top of the optical waveguide in the substrate and containing an oxide; and a second conductive thin film layer laminated on the first thin film layer and exhibiting acidic or neutral characteristics in its oxidized condition.

According to the constitution of a first characteristic of the above-described invention, since the electrode disposed on the substrate involves the first conductive thin film layer containing an oxide, and the second conductive thin film layer laminated on the first thin film layer and exhibiting acidic or neutral characteristics in its oxidized condition, a reaction of causing ion flux in the first thin film layer does not appear between the first thin film layer and the second thin film layer. Accordingly, it becomes hard to appear deterioration in electrode due to breakdown of the electrode, even if a voltage is continuously applied to the electrode, so that a life-product cycle and reliability thereof can be improved.

In the above-described optical waveguide device, the first thin film layer may contain an indium oxide (ITO).

In the above-described optical waveguide device, the second thin film layer may contain chromium.

In the above-described optical waveguide device, a protective film may be formed on at least one exposed surface of each of the first thin film layer and the second thin film layer.

In the above-described optical waveguide device, a third conductive thin film layer exhibiting neutral characteristics may be formed on the surface of the second thin film layer.

In the above-described optical waveguide device, the third thin film layer may contain gold.

In the above-described optical waveguide device, a protective film may be formed over the whole exposed surface of an electrode composed of the first thin film layer, the second thin film layer, and the third thin film layer.

In the above-described optical waveguide device, the substrate is fabricated from a lithium niobate ($LiNbO_3$) substrate; the optical waveguide is disposed on the lithium niobate substrate in such a manner that two Mach-Zehnder type directional couplers are formed, and further a phase shifter is formed in between these directional couplers; and the phase shifter is provided with an electrode of a structure containing the first thin film layer and the second thin film layer, whereby an electric field produced in response to a voltage applied to the electrode is given to the optical waveguide to function as a variable optical attenuator.

In the above-described optical waveguide device, the second thin film layer may be provided with a third conductive thin film layer laminated thereon and exhibiting neutral characteristics in its oxidized condition.

In the above-described optical waveguide device, the first thin film layer may be a thin film layer of indium oxide to which tin has been added (ITO); and the second thin film layer may be a chromium thin film layer.

In the above-described optical waveguide device, the third thin film layer may be a gold thin film layer.

A process for the production of an optical waveguide device according to the present invention comprises the steps of forming at least one optical waveguide in an LN (lithium niobate) substrate; forming an ITO film on the optical waveguide and the surface of the LN substrate; forming a photoresist on the ITO film to conduct a patterning operation; removing unnecessary portions of the ITO film by means of etching with use of the photoresist as a mask to form the ITO pattern; removing the photoresist on the ITO pattern; forming a chromium thin film having a thinner film thickness than that of the ITO film on the surface of the ITO pattern and an exposed surface of the substrate; applying a photoresist on the chromium thin film; removing unnecessary portions of the chromium thin film by means of etching; and removing the photoresist remained on the chromium thin film after the etching.

According to the constitution of a second characteristic of the above-described invention, an ITO film is formed on an LN substrate, then, an ITO pattern having a desired configuration is prepared from the ITO film, and a chromium thin film is formed on the ITO pattern, in this case, a film thickness of the chromium thin film is made thinner than that of the ITO film, and the chromium thin film is etched so as to obtain a desired configuration. Thus, an optical waveguide device provided with an electrode having a structure wherein no breakdown of the electrode appears can be produced while maintaining good adhesion of the chromium thin film.

BRIEF DESCRIPTION OF THE DRAWINGS

The present invention will be explained in more detail in conjunction with appended drawings, wherein.

DESCRIPTION OF THE PREFERRED EMBODIMENTS

In the following, embodiments of the present invention will be described in detail by referring to the accompanying drawings.

Before explaining the embodiments of the present invention, a prehistory leading to invention of an optical waveguide device according to the present application will be described. As a result of a close investigation concerning a cause for troubles (electrical migration) appearing in an electrode of an optical waveguide device having a structure as shown in FIG. 2, the cause has been made clear by the present inventors.

First, an examination as shown in Table 1 was made upon elements, which are considered optimal for producing an electrode used in an optical waveguide device.

As a result, a cause for deterioration of the electrode could be determined. The cause resides in that an oxide of titanium (Ti) being $TiO_2$ exhibits alkaline, and a mechanism of the generation can also be made clear.

TABLE 1

| Element | Actions in Oxide | Density g/m³ | First Ionization Energy eV | Covalent Bond Radius A | Electronegativity eV | Melting Point °C. |
|---|---|---|---|---|---|---|
| Ti | $TiO_2$: Alkaline | 4.5 | 6.9 | 1.32 | 1.5 | 1668 |
| Au | $Au_2O_3$: Neutral | 9.3 | 9.2 | 1.94 | 1.7 | 1063 |
| In | InO: (Somewhat Acidic) | 7.3 | 5.8 | 1.5 | 2.4 | 166 |

First, dissolution of InO (indium oxide) being a component of the ITO thin film 21 arises as shown in the following chemical formulae:

(i)

(ii)

As a result of this dissolution, ion migration (ion flux) arises as follows.

In addition, precipitation of InO appears.

While repeating the reactions described above, InO and $In^{2+}$ migrate to a negative pole, and grow towards a positive pole (gold thin film 23). An electrode produced as described above causes an electrode short-circuit. In the structure shown in FIG. 2, since titanium oxide produced from the titanium thin film 22 is alkaline, the above-described reactions InO→$In^{2+}$+$O^{2-}$ and $H_2O$→$H^+$+$OH^+$ become active to grow In or InO, and it results finally in an electrode short-circuit.

Under the circumstances, when an electrode is constituted by laminating a first thin film layer and a second thin film layer on an LN substrate in the present invention for the sake of solving the above-described problem, the first thin film layer is formed in a conductive thin film layer containing an oxide, while the second thin film layer is formed in a conductive thin film layer exhibiting acidic or neutral characteristics in its oxidized condition.

According to such modification described above, it could have made to prevent an appearance of ion flux in the first thin film layer. It is to be noted that a third conductive thin film layer exhibiting neutral characteristics in its oxidized condition may be disposed on the second thin film layer.

[First Embodiment]

FIG. 1 is a perspective view showing a first embodiment of an optical waveguide device according to the present invention wherein a variable optical attenuator optimal to which the present invention is applied is shown as a specific example of optical waveguide device.

Figure 3:
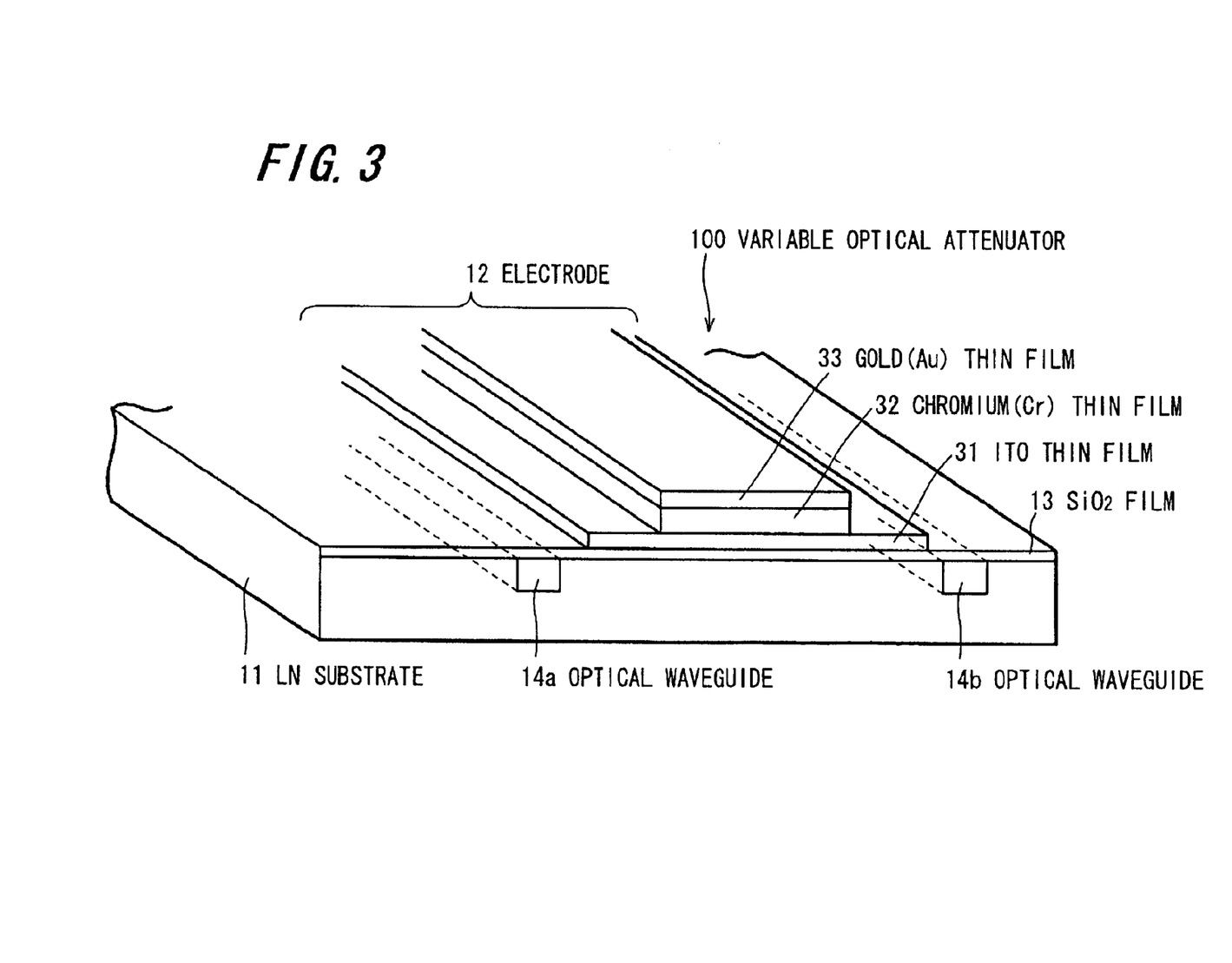
FIG. 3 is a perspective view showing a first embodiment of an optical waveguide device according to the present invention.

An optical waveguide device (a variable optical attenuator 100) is composed of an LN substrate 11, an electrode 12, and a $SiO_2$ film 13. Although the $SiO_2$ film 13 is disposed to suppress absorption of light from optical waveguides 4a and 4b, it is not necessarily required. On the surface of the LN substrate 11, the $SiO_2$ (silicon dioxide) film 13 is placed, and the electrode 12 is further disposed on the surface of the $SiO_2$ film 13. Optical waveguides 14a and 14b are disposed on the opposite sides of the electrode 12 in the vicinity of the surface of the LN substrate 11. The electrode 12 has a three-layered structure composed of an ITO thin film 31 disposed on the surface of the LN substrate, a chromium (Cr) thin film 32 disposed on the ITO thin film 31, and a gold thin film 33 disposed on the chromium thin film 32. It is desired that the chromium thin film 32 is a metal an oxide of which is somewhat acidic.

A process for the production of an optical waveguide device having a structure shown in FIG. 3 will be described. First, the optical waveguides 4a and 4b are formed in the vicinities of the surface of the LN substrate 11, respectively. Each of these optical waveguides 4a and 4b can be formed by such a manner that for example, a titanium metallic film strip having a desired waveguide pattern is deposited, and further it is allowed to diffuse into crystals. Then, the optical waveguides 4a and 4b as well as the surface of the LN substrate 11 are uniformly covered with the $SiO_2$ film 13, and further, an ITO thin film is formed with a certain thickness on the surface of the $SiO_2$ film 13 in accordance with sputtering method. Thereafter, a photoresist is formed on the ITO thin film, and is subjected to patterning (exposure, development and the like). The resulting photoresist thus patterned is used as a mask, and unnecessary portions of the ITO thin film are removed in accordance with the photoresist, whereby the ITO thin film 31 (ITO pattern) having a desired configuration and a desired size is formed. Then, a chromium thin film is formed on the surface of the ITO thin film 31 and an exposed surface of the $SiO_2$ film 13 in accordance with vapor deposition or the like after removing the photoresist on the ITO thin film 31. The chromium thin film is formed with a thinner thickness than that of the ITO thin film 31. Thereafter, a photoresist is applied to the chromium thin film, and then, a part of the photoresist other than that, which is to be left as the chromium thin film 32, is removed by etching, so that the chromium thin film 32 is formed. Then, a remaining photoresist on the chromium thin film 32 is removed. Moreover, the gold thin film 33 is formed on the chromium thin film 32 in accordance with the same manner as that applied in case of forming the chromium thin film 32.

The chromium thin film 32 exhibits a poor characteristic in adhesion to the ITO thin film 31. However, when a film thickness of the chromium thin film 32 is made thinner than that of the ITO thin film 31 as described above, a distortion can be reduced to elevate such adhesive properties. Thus, it becomes possible to improve reliability of an electrode.

Since an electrode of a three-layered structure is obtained by bonding different materials of the ITO thin film 31, the chromium thin film 32, and the gold thin film 33 each having a different electromotive force to each other, deterioration in the electrode can be prevented due to microelectrode effect.

The ITO thin film 31 is made of indium oxide to which has been added tin (ITO), and it is a transparent electrode having 90% or higher transmittance of visible light and 10Ω/□ or less sheet resistance value. In the ITO thin film 31, it is prevented from an increase in insertion loss by approaching the chromium thin film 32 and the gold thin film 33 to optical waveguides through the $SiO_2$ film 13 due to displacement. Furthermore, the chromium thin film 32 functions as an adhesive for bonding the ITO thin film 31 and the gold thin film 33 to each other.

Table 2 represents characteristic properties of the chromium thin film 32.

TABLE 2

| Element | Actions in Oxide | Density g/m³ | First Ionization Energy eV | Covalent Bond Radius A | Electronegativity eV | Melting Point ° C. |
|---|---|---|---|---|---|---|
| Cr | $CrO_4^{2-}$: Acidic | 7.2 | 6.8 | 1.17 | 1.6 | 1875 |

As shown in Table 2, in the chromium thin film 32 used in the present embodiment, $CrO_4^{2-}$, which is an oxide of the chromium thin film 32, is acidic. Furthermore, since indium oxide (InO) contained in ITO exhibits also acidic characteristics as shown in Table 1, a reaction of ion flux can be suppressed, so that electrode short-circuit can be prevented. Accordingly, product-life cycle and reliability in optical waveguide device are elevated.

In the above-described embodiment, although an oxide of the chromium thin film 32 has been acidic, the oxide is not limited thereto, but any oxide exhibiting acidic characteristics other than that of alkaline causing a reaction of ion flux, and hence, it may be an oxide exhibiting neutral characteristics. Moreover, although a chromium (Cr) thin film has been used for the electrode 12, the present invention is not limited to such chromium thin film, but any metal may be used so far as an oxide of which exhibits neutral or acidic characteristics. Besides, although an Au thin film has been used for the third layer, a metal other than the Au thin film may be used so far as it has close functions (physical properties) to that of the Au thin film.

[Second Embodiment]

Figure 4A:
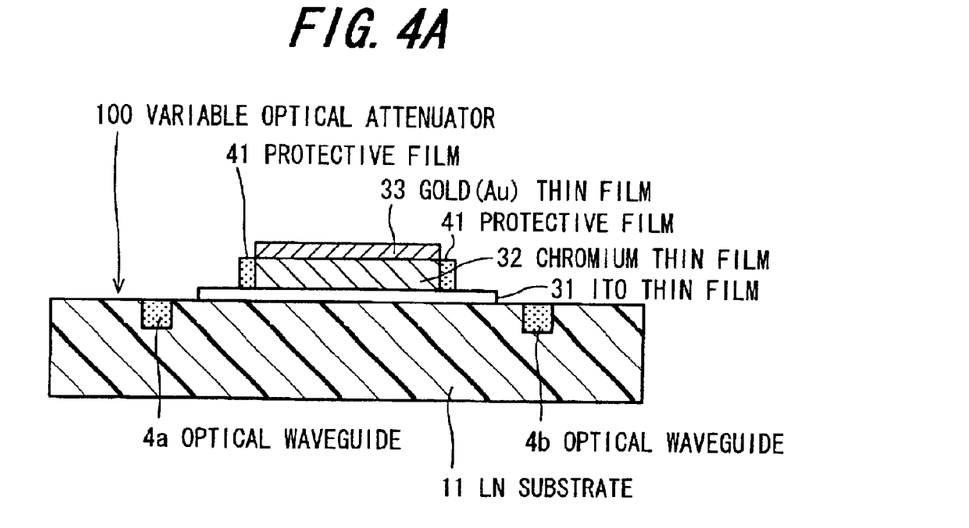
FIGS. 4(a) and 4(b) are sectional views each showing a second embodiment of an optical waveguide device according to the present invention.
Figure 4B:
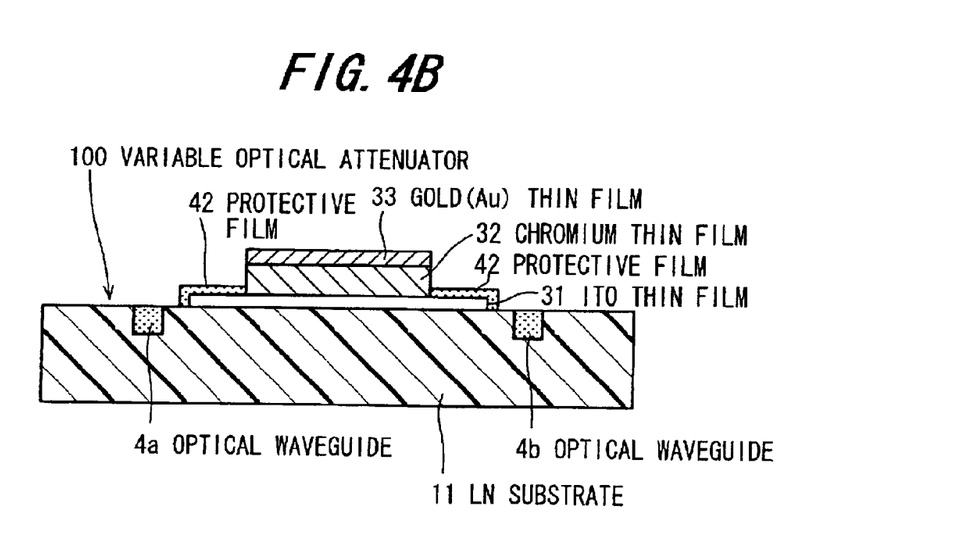

FIGS. 4(*a*) and 4(*b*) are schematic views each showing a second embodiment of an optical waveguide device according to the present invention.

As described above, ion flux can be prevented by forming an acidic or a neutral metallic thin film on an ITO thin film 21. In this respect, when a protective film 41 made of polyimide, a polymer, $SiO_2$, SiN and the like is disposed on at least sides of a second layered chromium thin film 32 as shown in FIG. 4(*a*) in the constitution shown in FIG. 3, a suppressing effect in a reaction of ion flux is further elevated. In another modification as shown in FIG. 4(*b*), when the ITO thin film 21 is covered with a protective film 42 made of a nitride film and the like, the same effects can be obtained. The protective films shown in FIGS. 4(*a*) and 4(*b*) are applicable also to an optical waveguide device having a constitution shown in FIG. 2, as a result of such modification, problems involved in the prior art appearing due to use of a titanium thin film 22 can be reduced.

[Third Embodiment]

Figure 5:
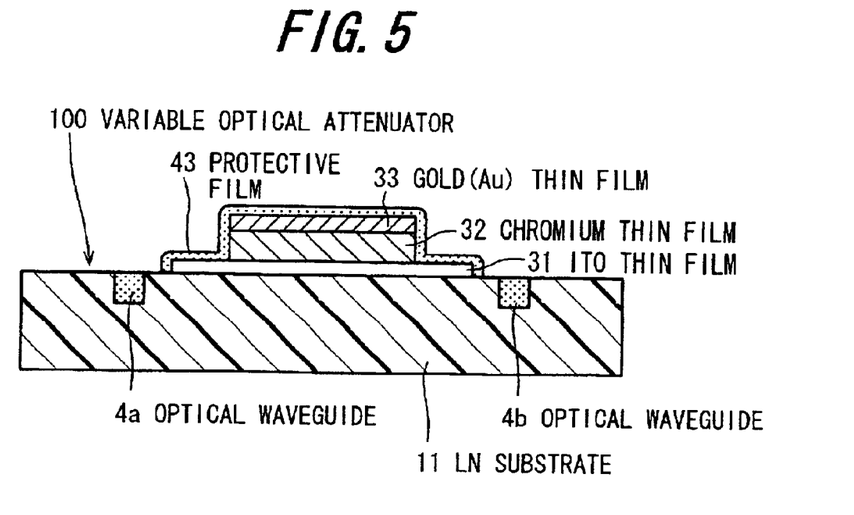
FIG. 5 is a sectional view showing a third embodiment of an optical waveguide device according to the present invention.

FIG. 5 is a schematic view showing a third embodiment of an optical waveguide device according to the present invention wherein an electrode 12 is in contact with ambient air, so that the electrode 12 reacts with oxygen in the air, whereby deterioration in the electrode is prevented. For this purpose, a protective film 43 is disposed so as to cover the whole electrode 12. The protective film 43 may be formed from polyimide, $SiO_2$ and the like.

While a variable optical attenuator has been described as an embodiment of an optical waveguide device in the above description, the present invention is not limited to a variable optical attenuator, but it is also applicable to optical parts wherein an electrode structure according to the present invention is used, for example, optical switches, optical modulators and the like.

As is apparent from the above description, according to an optical waveguide device of the present invention, an electrode formed on a substrate involves a first thin film layer an oxide of which is acidic, and a second thin film layer disposed on the first thin film layer and exhibiting acidic or neutral characteristics in its oxidized condition. Accordingly, no reaction for causing ion flux in the first layer appears, whereby it becomes possible to cause no deterioration in the electrode. As a result, electrode short-circuit can be prevented, so that product-life cycle and reliability thereof can be elevated.

According to a process for the production of an optical waveguide device of the present invention, it is constituted in such that an ITO film is formed on an LN substrate, then, the ITO film is etched to obtain an ITO pattern having a desired profile, a chromium thin film is formed on the ITO pattern, in this case, the chromium thin film is formed so as to be thinner than that of the ITO film, and the resulting chromium thin film is etched to obtain a desired configuration. Thus, an optical waveguide device provided with an electrode having a structure where no electrode breakdown appears can be obtained while maintaining good adhesive properties of the chromium thin film.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An optical waveguide device, comprising:
   a substrate;
   at least one optical waveguide disposed in said substrate;
   a first conductive thin film layer placed in the vicinity of or on the top of said optical waveguide in said substrate and containing an oxide; and
   a second conductive thin film layer laminated on said first thin film layer and exhibiting acidic or neutral characteristics in its oxidized condition,
   wherein said substrate is a lithium niobate ($LiNbO_3$) substrate, said optical waveguide comprises two Mach-Zehnder type directional couplers and a phase shifter between these directional couplers, and said phase shifter comprises an electrode of a structure containing said first thin film layer and said second thin film layer, whereby an electric field produced in response to a voltage applied to said electrode is given to said optical waveguide to function as a variable optical attenuator.

2. An optical waveguide device as claimed in claim 1, wherein:
   said first thin film layer contains an indium oxide (ITO).

3. An optical waveguide device as claimed in claim 1, wherein:
   said second thin film layer contains chromium.

4. An optical waveguide device as claimed in claim 1, wherein:
   a protective film is formed on at least one exposed surface of each of said first thin film layer and said second thin film layer.

5. The optical waveguide of claim 1,
   wherein a third conductive thin film layer exhibiting neutral characteristics is formed on the surface of said second thin film layer.

6. An optical waveguide device as claimed in claim 5, wherein:
said third thin film layer contains gold.

7. An optical waveguide device as claimed in claim 5, wherein:
a protective film is formed over the whole exposed surface of an electrode composed of said first thin film layer, said second thin film layer, and said third thin film layer.

8. An optical waveguide device as claimed in claim 1, wherein:
said second thin film layer is provided with a third conductive thin film layer laminated thereon and exhibiting neutral characteristics in its oxidized condition.

9. An optical waveguide device, comprising:
a substrate;
at least one optical waveguide disposed in said substrate;
a first conductive thin film layer placed in the vicinity of or on the top of said optical waveguide in said substrate and containing an oxide; and
a second conductive thin film layer laminated on said first thin film layer and exhibiting acidic or neutral characteristics in its oxidized condition,
wherein said first thin film layer is a thin film layer of indium oxide to which tin has been added (ITO) and said second thin film layer is a chromium thin film layer.

10. An optical waveguide device as claimed in claim 8, wherein:
said third thin film layer is a gold thin film layer.

11. A process for the production of an optical waveguide device, comprising the steps of:
forming at least one optical waveguide in an LN (lithium niobate) substrate;
forming an ITO film on said optical waveguide and the surface of said LN substrate;
forming a photoresist on said ITO film to conduct a patterning operation;
removing unnecessary portions of said ITO film by means of etching with use of said photoresist as a mask to form the ITO pattern;
removing the photoresist on said ITO pattern;
forming a chromium thin film having a thinner film thickness than that of said ITO film on the surface of said ITO pattern and an exposed surface of said substrate;
applying a photoresist on said chromium thin film;
removing unnecessary portions of said chromium thin film by means of etching; and
removing the photoresist remained on said chromium thin film after said etching.

12. The optical waveguide device of claim 9, further comprising a protective film on at least one exposed surface of each of said first thin film layer and said second thin film layer.

13. The optical waveguide device of claim 9, further comprising a third conductive thin film layer exhibiting neutral characteristics on the surface of said second thin film layer.

14. The optical waveguide device of claim 13, wherein said third thin film layer contains gold.

15. The optical waveguide device of claim 13, further comprising a protective film over the whole exposed surface of an electrode composed of said first thin film layer, said second thin film layer, and said third thin film layer.

16. The optical waveguide device of claim 9, wherein said second thin film layer has a third conductive thin film layer laminated thereon that exhibits neutral characteristics in its oxidized condition.

17. The optical waveguide device of claim 9, wherein:
said substrate is a lithium niobate ($LiNbO_3$) substrate;
said optical waveguide comprises two Mach-Zehnder type directional couplers and a phase shifter between these directional couplers; and
said phase shifter comprises an electrode containing said first thin film layer and said second thin film layer.

* * * * *